United States Patent [19]

Gowda

[11] Patent Number: 5,085,243
[45] Date of Patent: Feb. 4, 1992

[54] HYDRAULIC ISOLATION VALVE FOR RAILWAY VEHICLE

[75] Inventor: Padmanab L. Gowda, Greer, S.C.

[73] Assignee: Westinghouse Air Brake Company, Spartanburg, S.C.

[21] Appl. No.: 708,118

[22] Filed: May 29, 1991

Related U.S. Application Data

[63] Continuation-in-part of Ser. No. 655,474, Feb. 14, 1991, abandoned.

[51] Int. Cl.⁵ .............................................. F60T 17/18
[52] U.S. Cl. ..................................... 137/118; 303/71; 303/84.2
[58] Field of Search ............................ 137/87, 118, 599; 303/71, 84.2, 9.63; 188/153 R, 217

[56] References Cited

U.S. PATENT DOCUMENTS

| | | | |
|---|---|---|---|
| 2,466,441 | 4/1949 | Keller | 137/118 UX |
| 2,556,616 | 1/1971 | Hensley | 137/118 X |
| 2,930,391 | 3/1960 | Bass | 137/118 |
| 3,441,249 | 4/1969 | Aslan | 137/599 X |
| 3,729,014 | 3/1973 | Narumi | 137/118 X |
| 4,860,781 | 8/1989 | Fairman | 137/118 |

FOREIGN PATENT DOCUMENTS 539895  9/1941  United Kingdom ................ 137/118

Primary Examiner—Alan Cohan
Attorney, Agent, or Firm—G. J. Falce

[57] ABSTRACT

An isolation valve device for a hydraulic brake system of a railway vehicle including passageways via which hydraulic pressure communication is established between a pressure controller and the brake units of each truck of a railway vehicle, and diaphragm type flow control valves adapted to interrupt hydraulic pressure communication in a respective one of the passageways leading to the different truck brake units, when a pressure differential occurs therebetween, due to a ruptured brake line at one of the trucks, for example, causing a hydraulic fluid leak thereat.

10 Claims, 1 Drawing Sheet

HYDRAULIC ISOLATION VALVE FOR RAILWAY VEHICLE

This is a continuation-in-part of copending application Ser. No. 655,474, filed Feb. 14, 1991, now abandoned.

BACKGROUND OF THE INVENTION

This invention relates to isolation valves in hydraulic brake systems of railway vehicles and particularly to transit-type railway vehicles which employ spring-applied, hydraulic pressure released brake units.

Hydraulic brake systems employing spring-applied, pressure-released brake units are inherently safe from a braking standpoint, due to the fact that loss of hydraulic pressure for any reason will result in the brakes being automatically applied under spring force. Any leakage of hydraulic fluid, however, presents a safety hazard due to its environmental impact. Hydraulic fluid which is spewed onto the track area is not only a pollutant, but also presents a fire hazard, especially in the vicinity of third rail electrical systems.

So-called isolation valves are typically employed in these hydraulic brake systems to prevent such leakage of hydraulic fluid, in the event of a ruptured brake line. Generally, an isolation valve is located between the hydraulic pressure controller on each railway car and the brake units of the respective railway car truck. The isolation valve must sense a reduction in pressure in the brake circuit leading to the brake units of either truck and cut off the supply of hydraulic fluid to the truck having a leak in its brake circuit, while continuing to establish hydraulic pressure communication with the other truck brake units. In cutting off the supply of hydraulic fluid to the truck brake units having a leak in its brake circuit, without also cutting off the hydraulic fluid supply to the other truck brake units, only a single truck of the railway car experiences loss of brake control.

One known type of isolation valve relies on the differential pressure effective on opposite sides of a spool valve to shift the spool valve from a central position in which it is normally maintained by two springs, when a hydraulic leak occurs in either truck brake circuit. As long as the downstream pressure remains substantially equal in the separate truck braking circuits, the spring centers the spool valve, to establish hydraulic pressure communication between the controlled input pressure and each one of the respective truck brake circuits. In the event of leakage in either one of the truck brake circuits downstream of the isolation valve, the resultant low pressure therein creates a differential pressure to shift the spool valve in the appropriate direction from its normal central position and thereby cut off the supply of hydraulic fluid to the leaking brake circuit, while continuing to conduct hydraulic fluid to the other brake circuit.

If one of the centering springs breaks or binds for any reason, however, the spool will be forced to one side and will cut off the supply of hydraulic brake fluid to that particular brake circuit, even in the absence of any leakage whatsoever in that circuit. This will prevent the brakes from being released following a brake application, when an isolation valve of the type described is used in a hydraulic brake system having spring-applies, hydraulic pressure released brake units.

SUMMARY OF THE INVENTION

One object of the present invention is to provide an isolation valve that is simple in construction, low in cost, and reliable in operation.

Briefly, the foregoing objective is achieved by providing an isolation valve device having first and second passageways between a hydraulic pressure controller and the brake units of the respective trucks of a railway vehicle, there being a diaphragm disposed in a cavity via which the first and second passageways pass, each chamber so formed on opposite sides of the diaphragm having spaced-apart valve seats with which the diaphragm is engageable to provide flow control valve means being adapted to interrupt hydraulic pressure communication in a respective one of the passageways leading to the different truck brake units, in response to a pressure differential therebetween, when a hydraulic leak exists at one of the trucks, due to a ruptured brake line, for example.

BRIEF DESCRIPTION OF THE DRAWING

This object and other objects and advantages of the invention will become apparent from the following more detailed explanation of the invention, when considered in light of the accompanying

DESCRIPTION AND OPERATION

Figure 1:
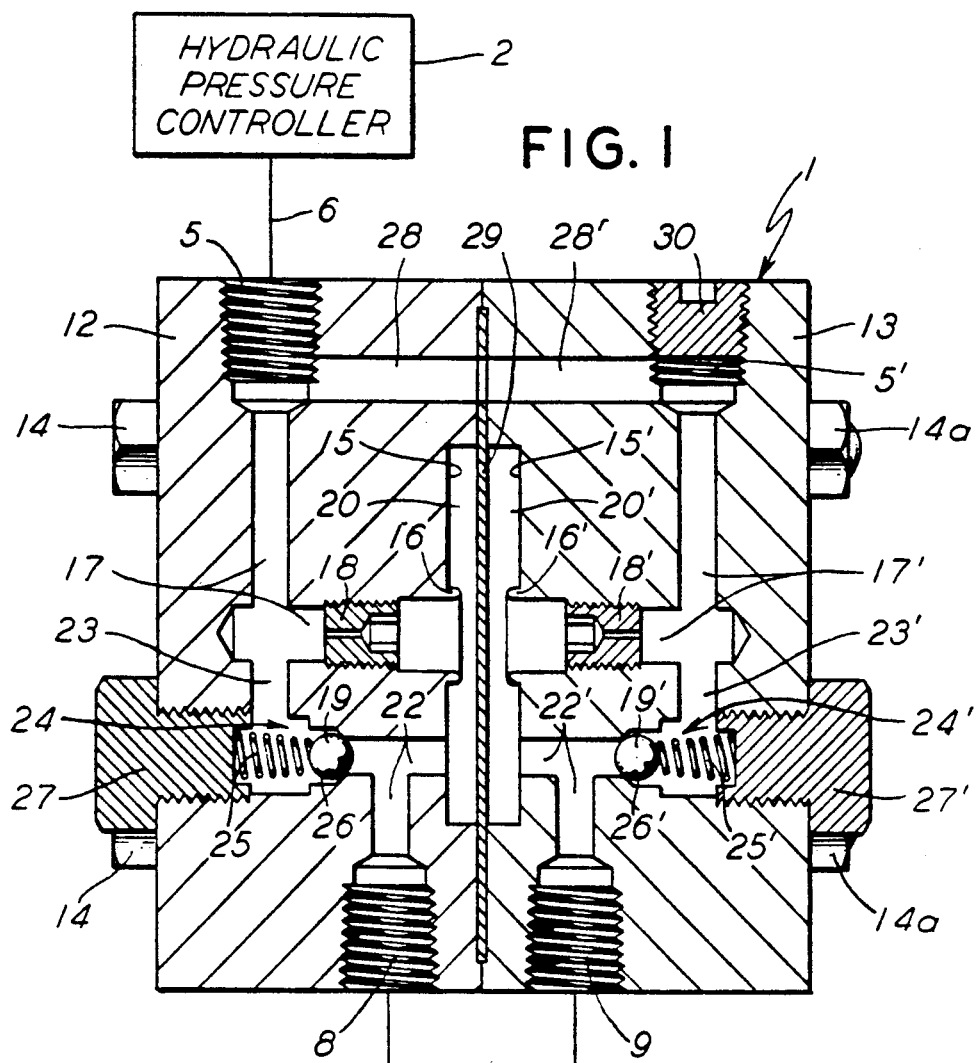
FIG. 1 is a schematic showing a hydraulic brake system for a railway vehicle including the isolation valve of the present invention in section.

In accordance with the present invention, there is shown an isolation valve device 1 interposed in a braking circuit between a hydraulic pressure controller 2 and the brake units 3, 4 of the respective trucks A, B of a railway vehicle. A primary inlet port 5 of isolation valve device 1 is connected by a brake line 6 to hydraulic pressure controller 1, which controls hydraulic fluid in the braking circuit. A pair of outlet ports 8 and 9 of isolation valve 1 is connected by brake lines 10 and 11 to the respective brake units 3 and 4 at the different trucks A and B. These brake units may be a well-known spring-applied, hydraulic pressure released type, such as typically employed in transit-type railway vehicles.

Isolation valve 1 consists of body segments 12, 13 which are held together preferably by four elongated bolts 14 and nuts 14a. A cavity 20 formed by a recess 15 in the face of body segment 12 includes an annular valve seat 16 to which inlet port 5 is connected by a passage 17 having a fluid flow restrictor, such as a choke fitting 18. Recess 15 is connected by a passage 22 to outlet port 8, which is in turn connected to passage 17 via a bypass passage 23 having a one-way check valve 24. A ball valve 19 of check valve 24 is biased by a light spring 25 toward engagement with its seat 26, so as to permit a back-flow of fluid in passages 22 and 23 in a direction from outlet port 8 to inlet port 5 in bypass of flow restrictor 18. A screw-threaded plug 27 closes an opening to passage 23 via which ball check valve 24 and spring 25 can be installed and removed. In actual practice, this check valve 24 may be a cartridge type assembly. Another passage 28 is connected from inlet port 5 to the face of body segment 12 that adjoins body segment 13.

Body segment 13 is similar to body segment 12, the corresponding parts being identified by like reference numerals that are distinguished by a prime (') mark. A single elastic diaphragm 29, however, is common to the respective body segments, being clamped at its outer periphery between the adjoining faces of body segments 12, 13. Preferably diaphragm 29 is formed from a Polyurethane material that exhibits good tear strength and elastic memory. When clamped in place, diaphragm 29 assumes a normal position in which it is centered in spaced-apart relationship between the respective valve seats 16, 16'. A plug 30 closes an auxiliary inlet port 5' of body segment 13 when hydraulic pressure controller 1 is connected to inlet port 5 of body segment 12. Alternatively, hydraulic pressure controller 1 can be connected to auxiliary inlet port 5', in which case inlet port 5 would be plugged.

In operation, isolation valve 1 normally conducts the flow of hydraulic fluid between hydraulic pressure controller 2 and brake units 3 and 4 of the respective trucks A and B. When controller 2 is initially activated, hydraulic fluid under pressure enters port 5 from brake line 6 and flows concurrently to cavities 20, 20' via the respective passages 17, 17', flow restrictors 18, 18' and valve seats 16, 16'. The spring effect exhibited by diaphragm 29, due to its elasticity, maintains diaphragm 29 substantially centered in its normal position during initial charging to accommodate flow of hydraulic fluid to the respective truck brake units 3, 4 via passages 22, 22', the outlet ports 8, 9 and brake lines 10, 11. The hydraulic fluid supplied to the respective brake units acts against the brake unit actuating springs to maintain the brake units in a release condition. The spring effect of diaphragm 29 resists such diaphragm flexure, due to pressure surges in lines 17, 17', as would otherwise cause the diaphragm to engage one or the other seat 16, 16'. In this manner, positive flow control is established and maintained in the respective brake circuits, so long as there is no leak in the downstream pressure to the brake units.

In order to initiate a brake application, the hydraulic pressure normally maintained by controller 2 is reduced in proportion to the desired braking force. Hydraulic fluid at brake units 3, 4 of the respective trucks A and B is then returned under brake spring force to the hydraulic controller via brake lines 10, 11, ports 8, 9, passages 22, 22', check valves 24, 24', passages 23, 23', port 5 and brake line 6, in bypass of flow restrictors 18, 18'. In bypassing flow restrictors 18, 18', an unrestricted return flow of hydraulic fluid occurs, so that pressure at brake units 3, 4 is quickly reduced. Accordingly, the brake unit actuating springs are effective to apply braking force without delay.

The brake application may be released either fully or partially by increasing hydraulic pressure at controller 2, this pressure increase being conducted to the respective brake circuits 3, 4 via isolation valve 1, as previously explained.

In the event a leak occurs in the hydraulic circuit between outlet port 8 and brake units 3 of truck A, such as at brake line 10, for example, the hydraulic pressure effective in cavity 20 drops, due to the fact that the supply through flow restrictor 18 will normally be less than the loss due to a line rupture. A force differential is thus created across diaphragm 29, due to the fact that the hydraulic pressure in cavity 20' acting on the one face of diaphragm 29 is isolated from the pressure drop in the hydraulic circuit of truck A acting on the opposite face of diaphragm 29. This pressure differential forces diaphragm 29 to deflect in the direction of valve seat 16 to effect engagement therewith and thereby interrupt the hydraulic flow path between controller 2 and brake units 3 via ruptured line 10, so that no further leakage of hydraulic fluid can occur.

In this deflected position of diaphragm 29, the hydraulic pressure supplied via flow restrictor 18 is effective on the reduced area of diaphragm 29 within the inner area of valve seat 16, and pressure supplied via restrictor 18' to the brake units 4 of truck B is effective across the full area of diaphragm 29 to maintain continued diaphragm deflection and consequent engagement with valve seat 16.

In order to reset isolation valve 1 following repair of the hydraulic leak, hydraulic pressure controller 2 must be deactivated, thereby causing the pressure at port 5 to be reduced to zero. As the pressure differential across diaphragm 29 consequently approaches equalization, the spring effect, due to the diaphragm elasticity, will return diaphragm 29 to its normal center position. The hydraulic circuit may then be recharged, as previously explained, with isolation valve 1 being restored to an active condition in which control of the hydraulic pressure in the brake circuits of both trucks A and B is re-established.

Figure 2:
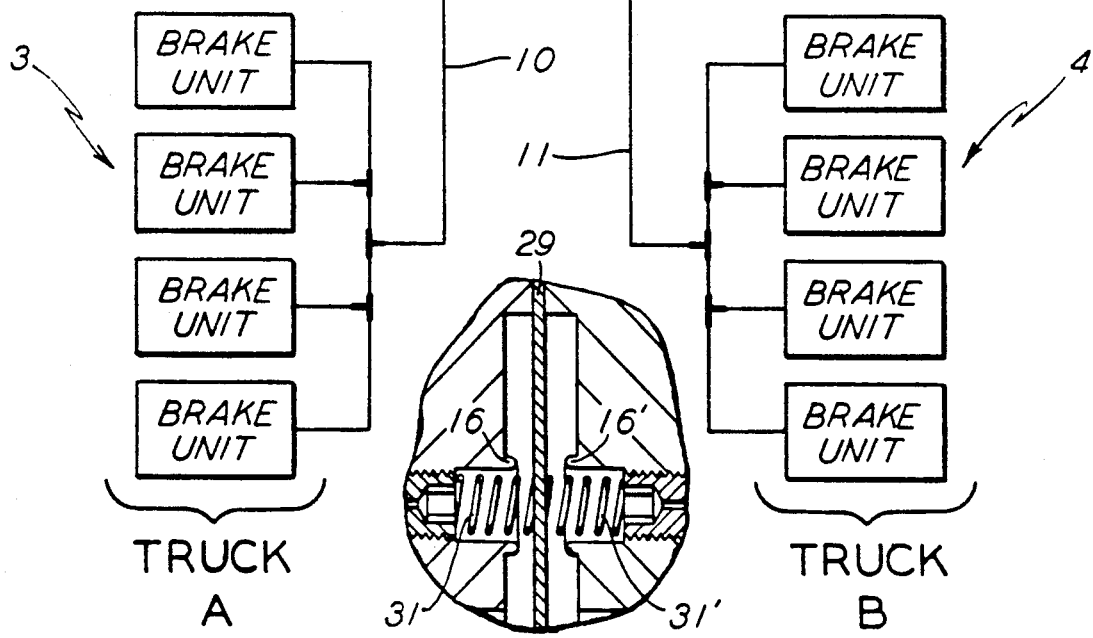
FIG. 2 is a fragmentary view of the isolation valve of FIG. 1 modified in accordance with an alternate embodiment of the invention.

In the alternate embodiment of the invention shown in FIG. 2 of the drawings, a pair of centering springs 31, 31' are employed, one on each side of diaphragm 29. Each spring is nested in the cavity housing the respective choke fittings 18, 18' within the periphery of annular valve seats 16, 16' and exerts a relatively light opposing force on the diaphragm member to positively establish a mid-position of the diaphragm in the absence of any substantial pressure differential thereacross. The centering spring force will also reinforce the normal centering bias inherent in the diaphragm itself, in order to more positively maintain the diaphragm center position against relatively low pressure differentials that normally develop during system charging, due to pressure surges, for example, and during bleeding of the air which is normally introduced into the hydraulic circuit during system charging. Because of the relatively small spacing between diaphragm 29 and valve seats 16, 16' necessitated by the use of a single elastic diaphragm, as opposed to shuttle valves, for example, the possibility exists that such pressure surges in the system during charging and bleeding may cause sufficient deflection of the diaphragm to inappropriately close off supply to one or the other braking circuits. The use of centering springs 31, 31' obviates this problem by positively maintaining the diaphragm centered against low pressure differentials associated with pressure surges experienced during system charging and pressure drops experienced during bleeding, but allows the springs 30, 31' to appropriately deflect in the event of a pressure differential arising, such as is typically encountered when a rupture occurs in one of the brake lines 10 or 11.

I claim:

1. In a hydraulic brake system of a railway vehicle, an isolation valve device for interrupting hydraulic pressure communication between a hydraulic pressure controller and the brake units of one truck of the railway vehicle when a hydraulic leak exists thereat, without interrupting hydraulic pressure communication between the pressure controller and the brake units of the other truck of the railway vehicle, said isolation valve device comprising:

(a) a primary inlet connected to hydraulic pressure controller;

(b) first and second outlets connected to the brake units of said one truck and said other truck of said railway vehicle, respectively;

(c) a cavity;

(d) a diaphragm member separating said cavity into first and second chambers, each said chamber having an annular valve seat with which the respective opposing sides of said diaphragm are cooperatively arranged to provide first and second flow control valves;

(e) a first passageway between said primary inlet and said first outlet, said valve seat of said first chamber separating said first passageway into an upstream portion and a downstream portion;

(f) a second passageway between said primary inlet and said second outlet, said valve seat of said second chamber separating said second passageway into an upstream portion and a downstream portion, said primary inlet being common to said upstream portion of said first and second passageways;

(g) first and second fluid flow restrictors in said upstream portions of respective ones of said first and second passageways;

(h) first and second bypass passages between said upstream and downstream portions of respective ones of said first and second passageways; and (i) first and second one-way check valves in said first and second bypass passages, respectively.

2. An isolation valve device, as recited in claim 1, wherein said first and second check valves are in parallel with said first and second flow restrictors respectively.

3. An isolation valve device, as recited in claim 2, wherein said first and second check valves are open in the direction of flow of hydraulic fluid from said downstream portion to said upstream portion of respective ones of said first and second passageways.

4. An isolation valve device, as recited in claim 1, wherein said valve seats of said first and second chambers are in confronting, spaced-apart relationship, said diaphragm being disposed therebetween such as to be normally disengaged from both said valve seats in the absence of a pressure differential effective in said first and second chambers acting on said diaphragm and engageable with one or the other of said valve seats of said first and second chambers in the presence of a pressure differential therebetween.

5. An isolation valve device, as recited in claim 4, wherein the annular area of said diaphragm enclosed within the periphery of said valve seats of said first chamber during engagement of said diaphragm therewith is equal to the area of said diaphragm enclosed within the periphery of said valve seat of said second chamber during engagement of said diaphragm therewith.

6. An isolation valve device, as recited in claim 5, wherein the area of said one and said other sides of said diaphragm within said first and second chambers is equal, being greater than the area of said diaphragm enclosed within the periphery of said valve seats of said first and second chambers.

7. An isolation valve device, as recited in claim 1, further comprising:

(a) an auxiliary inlet common to said upstream portion of said first and second passageways; and (b) a plug in one of said primary and auxiliary inlets and the other of said primary and auxiliary inlets being connected to said hydraulic pressure controller.

8. An isolation valve device, as recited in claim 1, wherein said brake units of said one and said other truck of said railway vehicle are spring-applied, hydraulic pressure released.

9. An isolation valve device, as recited in claim 1, further comprising spring means in said first and second chambers for biasing said diaphragm member to a central position in spaced-apart relationship with said annular valve seat of said first and second chambers.

10. An isolation valve device, as recited in claim 9, wherein said spring means is disposed within the periphery of said annular valve seat of said first and second chambers.

* * * * *